US010135843B2

(12) United States Patent
Ardeli et al.

(10) Patent No.: US 10,135,843 B2
(45) Date of Patent: *Nov. 20, 2018

(54) CLIENT REPUTATION DRIVEN ROLE-BASED ACCESS CONTROL

(71) Applicant: Aruba Networks, Inc., Sunnyvale, CA (US)

(72) Inventors: Ramesh Ardeli, Sunnyvale, CA (US); Hari Krishna Kurmala, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,235

(22) Filed: Nov. 21, 2017

(65) Prior Publication Data

US 2018/0077172 A1 Mar. 15, 2018

Related U.S. Application Data

(63) Continuation of application No. 14/445,711, filed on Jul. 29, 2014, now Pat. No. 9,848,005.

(51) Int. Cl.
H04L 29/06 (2006.01)

(52) U.S. Cl.
CPC ........ H04L 63/1408 (2013.01); H04L 63/101 (2013.01)

(58) Field of Classification Search
CPC .......................... H04L 63/1408; H04L 63/101
See application file for complete search history.

(56) References Cited

U.S. PATENT DOCUMENTS

| 7,562,304 | B2 * | 7/2009 | Dixon | G06F 17/30861 |
| | | | | 705/35 |
| 7,610,344 | B2 * | 10/2009 | Mehr | H04L 51/12 |
| | | | | 706/16 |
| 7,660,902 | B2 * | 2/2010 | Graham | G06F 21/6245 |
| | | | | 709/203 |
| 7,818,343 | B1 * | 10/2010 | Sekhar | G06Q 10/10 |
| | | | | 707/781 |
| 8,484,739 | B1 * | 7/2013 | Seshadri | G06F 11/3006 |
| | | | | 709/224 |
| 8,781,093 | B1 | 7/2014 | Rybak et al. | |
| 8,793,255 | B1 | 7/2014 | Bilinski et al. | |
| 9,674,112 | B2 | 6/2017 | Hamdi et al. | |
| 2005/0262566 | A1 | 11/2005 | Gassoway | |
| 2008/0178259 | A1 | 7/2008 | Alperovitch et al. | |
| 2008/0244074 | A1 | 10/2008 | Baccas et al. | |
| 2009/0086651 | A1 | 4/2009 | Luft | |
| 2009/0287819 | A1 | 11/2009 | Iverson | |

(Continued)

Primary Examiner — Sarah Su
(74) Attorney, Agent, or Firm — Hewlett Packard Enterprise Patent Department

(57) ABSTRACT

The present disclosure discloses a system and method for dynamically modifying role based access control for a client based on the activity. Generally, a client device is granted access to a network resource based on a first reputation score assigned to the client device. The activity of the client device is monitored. Responsive to monitoring the activity of the client device, a second reputation score is determined for the client device based on the activity. The access by the client device to the network resource is then modified to be granted based on the second reputation score.

20 Claims, 9 Drawing Sheets

(56) References Cited

U.S. PATENT DOCUMENTS

| | | |
|---|---|---|
| 2010/0121964 A1 | 5/2010 | Rowles et al. |
| 2010/0122333 A1 | 5/2010 | Noe |
| 2010/0217811 A1 | 8/2010 | Kay |
| 2011/0023118 A1 | 1/2011 | Wright |
| 2011/0276604 A1 | 11/2011 | Hom et al. |
| 2012/0054847 A1 | 3/2012 | Schultz et al. |
| 2012/0131683 A1 | 5/2012 | Nassar et al. |
| 2012/0233665 A1 | 9/2012 | Ranganathan et al. |
| 2012/0297481 A1 | 11/2012 | Boot et al. |
| 2013/0040603 A1 | 2/2013 | Stahlberg et al. |
| 2013/0042294 A1 | 2/2013 | Colvin et al. |
| 2013/0046683 A1 | 2/2013 | Onder et al. |
| 2013/0065562 A1 | 3/2013 | Singh |
| 2013/0282760 A1* | 10/2013 | Pendse .............. G06F 17/30289 707/780 |
| 2013/0304900 A1 | 11/2013 | Trabelsi et al. |
| 2015/0007315 A1 | 1/2015 | Rivera et al. |
| 2015/0026313 A1 | 1/2015 | Chawla et al. |
| 2015/0113132 A1 | 4/2015 | Sriniva et al. |
| 2015/0278916 A1 | 10/2015 | Stoll et al. |
| 2015/0281193 A1 | 10/2015 | Zheng |
| 2015/0371016 A1 | 12/2015 | Nielsen |
| 2015/0381376 A1 | 12/2015 | Wardman et al. |

* cited by examiner

If $w_{app} = 1$, $w_{URL} = 10$, $w_{file} = 5$, $w_{ids} = 1$, $w_{dlp} = 5$
Initial Client Reputation = 100
Threshold Reputation = 20

| Client | Applications | Number of blocked sessions ||||| Client Reputation |
| | | Malware/Spyware URL | Attachment/MIME type | IDS/IPS | DLP | |
|---|---|---|---|---|---|---|
| C1 | 5 | 2 | 0 | 0 | 0 | 75 |
| C2 | 0 | 6 | 2 | 0 | 2 | 20 |
| C3 | 2 | 2 | 0 | 2 | 0 | 76 |
| C4 | 0 | 4 | 0 | 0 | 4 | 40 |
| ... | ... | ... | ... | ... | ... | ... |
| Cn | 4 | 2 | 4 | 1 | 4 | 35 |

FIG. 8

CLIENT REPUTATION DRIVEN ROLE-BASED ACCESS CONTROL

FIELD

The present disclosure relates to dynamically modifying role-based access privileges of a client. In particular, the present disclosure relates to computing a reputation for the client based on a network activity of the client and modifying the access privileges of the client based on the reputation.

BACKGROUND

Client devices are assigned a specific role corresponding to a job function in enterprise organizations. Each role has a set of permissions to execute certain operations associated with that role. Once the client device is assigned a role, there is no provision to automatically and dynamically restrict the client device to a less privileged role when the client device starts to misbehave. This handicap can negatively influence the productivity of the enterprise organization due to the client device continuing to misbehave in the assigned role.

BRIEF DESCRIPTION OF THE DRAWINGS

The present disclosure may be best understood by referring to the following description and accompanying drawings that are used to illustrate embodiments of the present disclosure.

FIG. 8 illustrates an example graphical representation illustrating a process for determining a client reputation score according to embodiments of the present disclosure.

DETAILED DESCRIPTION

In the following description, several specific details are presented to provide a thorough understanding. While the context of the disclosure is directed to task processing and resource sharing in a distributed wireless system, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relates to dynamically modifying role-based access control of a client device. In particular, the access control of the client device is modified based on the activity of the client device. Specifically, the client device is granted access to a network resource based on a first reputation score assigned to the client device. The activity of the client device is monitored. Based on the monitoring, the first reputation score is modified to a second reputation score. The access by the client device to the network resource is then modified to be granted based on the second reputation score.

In some embodiments, the activity of the client device monitored for include: unpermitted application access, web content requests issued, banned file attachments in email, intrusions and/or malicious attacks generated, and confidential data breach. In some embodiments, the first reputation score of the client device is modified to the second reputation score proportional to a weight associated with each of one or more activities of the client device being monitored. In some embodiments, the access by the client device to the network resource is downgraded when the second reputation score of the client device goes below a certain first threshold. Responsive to the downgrade, the access of the client device is restricted. In some other embodiments, the client device is blacklisted when the second reputation score of the client device goes below a certain second threshold. Responsive to the blacklist, the client device cannot connect to any of the access points.

In some embodiments, when the activity of the client device after the downgrade starts to conform to administrative policies dictating good behavioral practices, the reputation score can gradually build up. In some embodiments, the access by the client device to the network resource is upgraded when the reputation score of the client device goes above a certain third threshold.

Computing Environment

Figure 1:
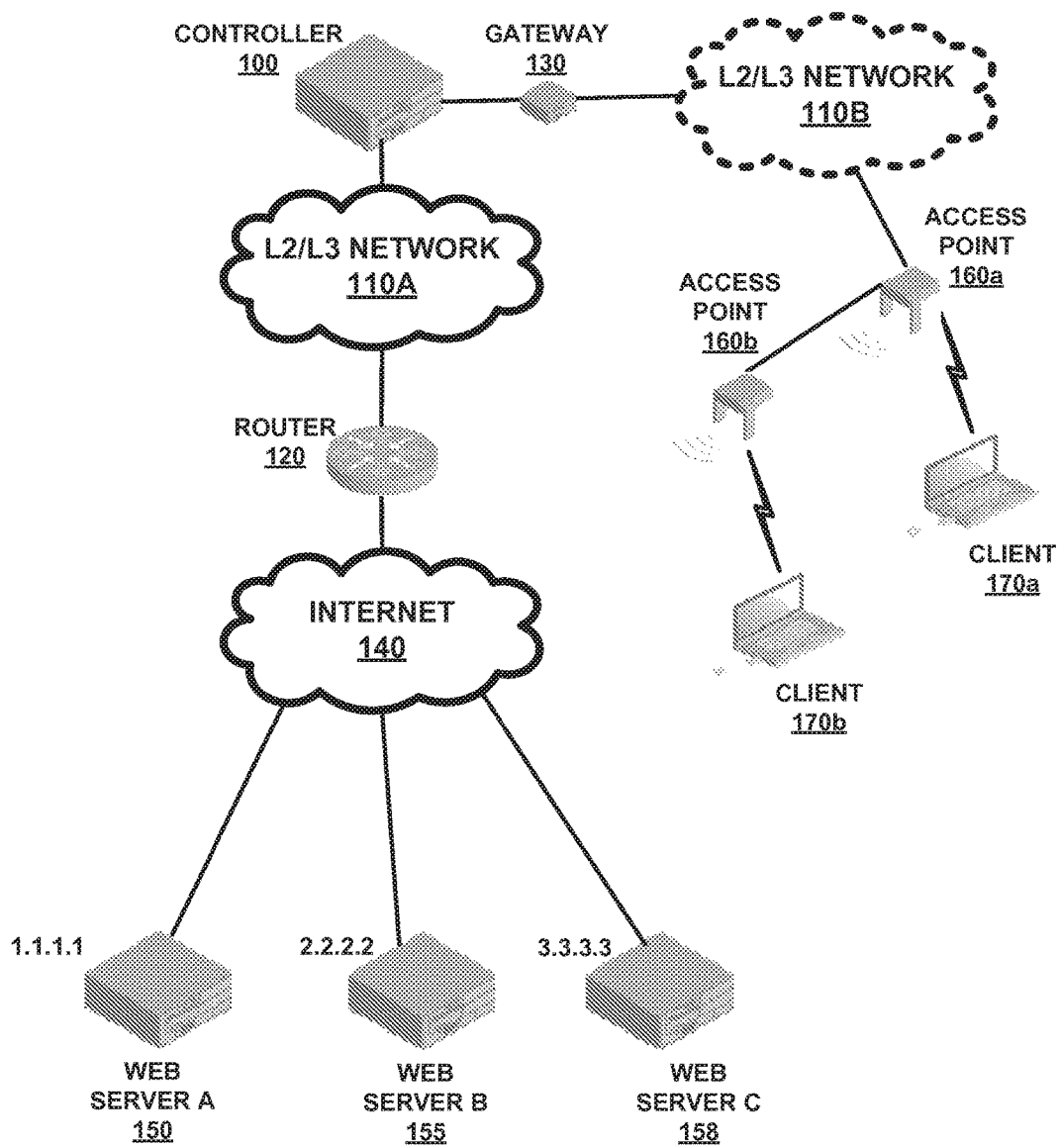
FIG. 1 is a block diagram illustrating an example network environment according to embodiments of the present disclosure.

FIG. 1 shows an example digital network environment 199 according to embodiments of the present disclosure. FIG. 1 includes at least one or more network controller (such as controller 100), one or more access points (such as access point 160a, 160b), one or more client devices (such as client 170a, 170b), a layer 2 or layer 3 network (such as L2/L3 network 110a, 110b), a routing device (such as router 120), a gateway 130, Internet 140, and one or more web servers (such as web server A 150, web server B 155, and web server C 158), etc. The components of the digital network environment 199 are communicatively coupled to each other. In some embodiments, the digital network environment 199 may include other components not shown in FIG. 1 such as an email server, a cloud-based storage device, etc. It is intended that any of the servers shown may represent an email server instead as illustrated with email functionalities and any of the network devices may serve as a cloud-based storage device. The network 140 may be implemented within a cloud environment. In FIG. 1 and the remaining figures, a letter after a reference number, e.g., "160a," represents a reference to the element having that particular reference number. A reference number in the text without a following letter, e.g., "160," represents a general reference to implementations of the element bearing that reference number.

The controller 100 is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc. In some embodiments, the controller 100 is an optional component in the digital network environment 199.

Moreover, assuming that a number of access points, such as access point 160, are interconnected with the network controller 100. Each access point 160 may be interconnected with zero or more client devices via either a wired interface or a wireless interface. In this example, for illustration purposes only, assuming that the client 170a is associated with the access point 160a via a wireless link. An access point 160 generally refers to a network device that allows wireless clients to connect to a wired network. Access points 160 usually connect to a controller 100 via a wired network or can be a part of a controller 100 in itself. For example, the access point 160a is connected to the controller 100 via an optional L2/L3 network 110B. In some embodiments, an access point 160 can be connected to another access point 160. For example, the access point 160a is connected to the access point 160b.

Wired interfaces typically include IEEE 802.3 Ethernet interfaces, used for wired connections to other network devices such as switches, or to a controller. Wireless interfaces may be WiMAX, 3G, 4G, and/or IEEE 802.11 wireless interfaces. In some embodiments, controllers and APs may operate under control of operating systems, with purpose-built programs providing host controller and access point functionality.

Furthermore, the controller 100 can be connected to the router 120 through zero or more hops in a layer 3 or layer 2 network (such as L2/L3 Network 110A). The router 120 can forward traffic to and receive traffic from the Internet 140. The router 120 generally is a network device that forwards data packets between different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A data packet is typically forwarded from one router 120 to another router 120 through the Internet 140 until the packet gets to its destination.

The gateway 130 is a network device that passes network traffic from local subnet to devices on other subnets. In some embodiments, the gateway 130 may be connected to a controller 100 or be a part of the controller 100 depending on the configuration of the controller 100. In some embodiments, the gateway 130 is an optional component in the digital network environment 199.

Web servers 150, 155, and 158 are hardware devices and/or software modules that facilitate delivery of web content that can be accessed through the Internet 140. For example, the web server A 150 may be assigned an IP address of 1.1.1.1 and used to host a first Internet website (e.g., www.yahoo.com); the web server B 155 may be assigned an IP address of 2.2.2.2 and used to host a second Internet website (e.g., www.google.com); and, the web server C 158 may be assigned an IP address of 3.3.3.3 and used to host a third Internet website (e.g., www.facebook-.com).

The client 170 may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only one client 170 is illustrated in FIG. 1, a plurality of clients 170 can be included in FIG. 1.

Network Device for Access Control Application

Figure 2:
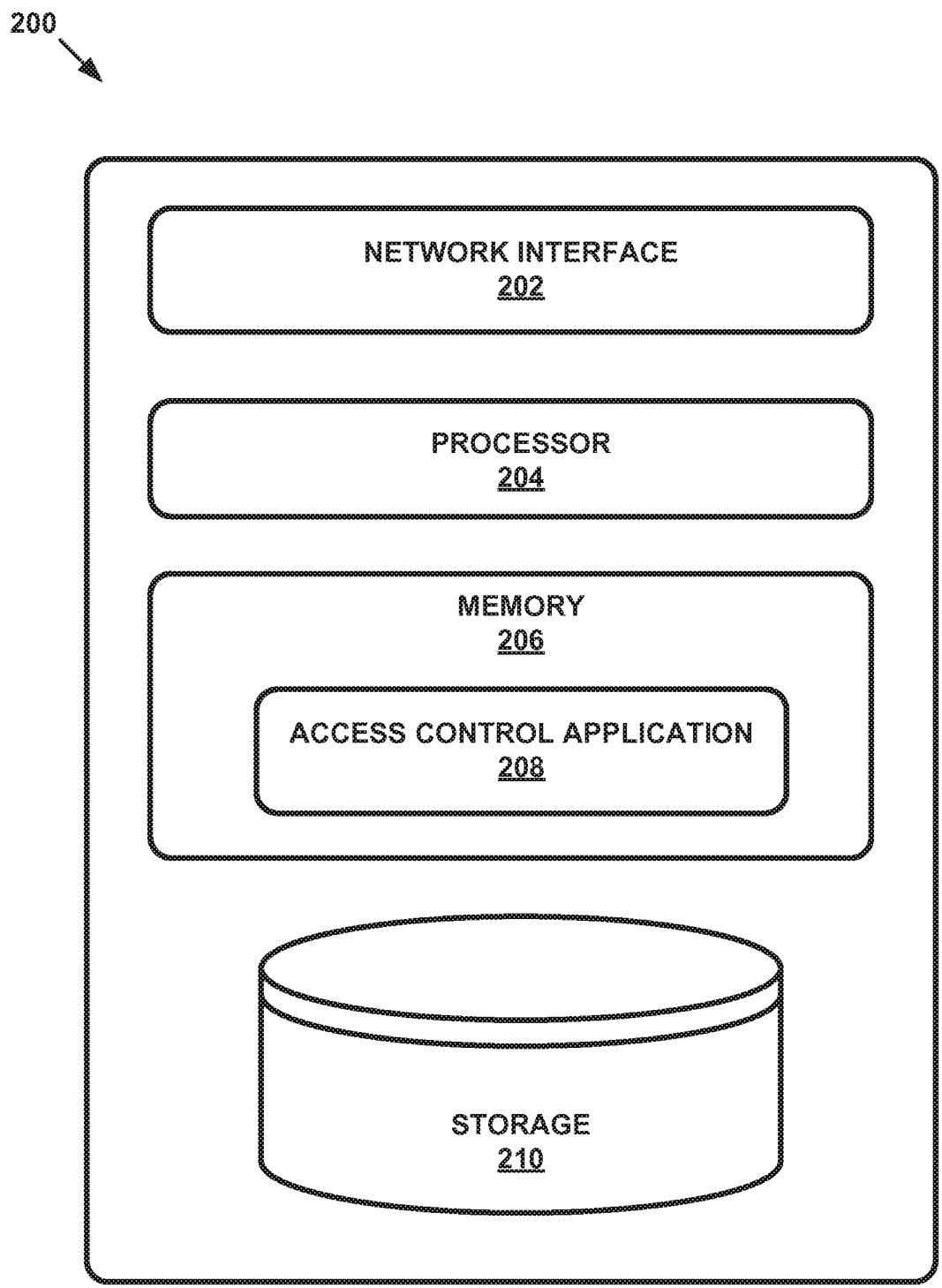
FIG. 2 is a block diagram illustrating an example network device according to embodiments of the present disclosure.

FIG. 2 is a block diagram illustrating an example network device system 200 for dynamically modifying role-based access control of a client 170 according to embodiments of the present disclosure. The network device 200 may be used as a network switch, a network router, a network controller, a network server, an access point, etc. Further, the network device 200 may serve as a node in a distributed or a cloud computing environment.

According to embodiments of the present disclosure, network services provided by the network device 200, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc. In some embodiments, the network device or system 200 may serve as a node in a distributed or a cloud computing environment.

In some embodiments, the network device 200 includes a network interface 202 capable of communicating to a wired network, a processor 204, a memory 206 and a storage device 210. The components of the network device 200 are communicatively coupled to each other.

The network interface 202 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, the network interface 202 may be software-defined and programmable, for example, via an Application Programming Interface (API), and thus allowing for remote control of the network device 200.

The processor 204 includes an arithmetic logic unit, a microprocessor, a general purpose controller or some other processor array to perform computations and provide electronic display signals to a display device. Processor 204 processes data signals and may include various computing architectures including a complex instruction set computer (CISC) architecture, a reduced instruction set computer (RISC) architecture, or an architecture implementing a combination of instruction sets. Although FIG. 2 includes a single processor 204, multiple processors 204 may be included. Other processors, operating systems, sensors, displays and physical configurations are possible. In some embodiments, the processor 204 includes a networking processor core that is capable of processing network data traffic.

The memory 206 stores instructions and/or data that may be executed by the processor 204. The instructions and/or data may include code for performing the techniques described herein. The memory 206 may be a dynamic random access memory (DRAM) device, a static random access memory (SRAM) device, flash memory or some other memory device. In some embodiments, the memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 206 stores an access control application 208. The access control application 208 can be the code and routines that, when executed by processor 204, cause the network device 200 to dynamically modify role-based access control of a client 170. In some embodiments, a node can be an access point 160. In some other embodiments, a node can be a controller 100, a router 120, a gateway 130, a switch or any other network device. In some embodiments, the access control application 208 can be located in an access point 160. In some other embodiments, the access control application 208 can be located in a controller 100, a router 120, a gateway 130, a switch or any other network device. In some embodiments, the access control application 208 can be implemented using hardware including a Field-Programmable Gate Array (FPGA) or an Application-Specific Integrated Circuit (ASIC). In some other embodiments, the access control application 208 can be implemented using a combination of hardware and software. In some embodiments, the access control application 208 may be stored in a combination of the network devices, or in one of the network devices. The access control application 208 is described below in more detail with reference to FIG. 3.

The storage device 210 can be a non-transitory memory that stores data for providing the functionality described herein. The storage device 210 may be a dynamic random access memory (DRAM) device, a static random access memory (SRAM) device, flash memory or some other memory devices. In some embodiments, the storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Access Control Application

Figure 3:
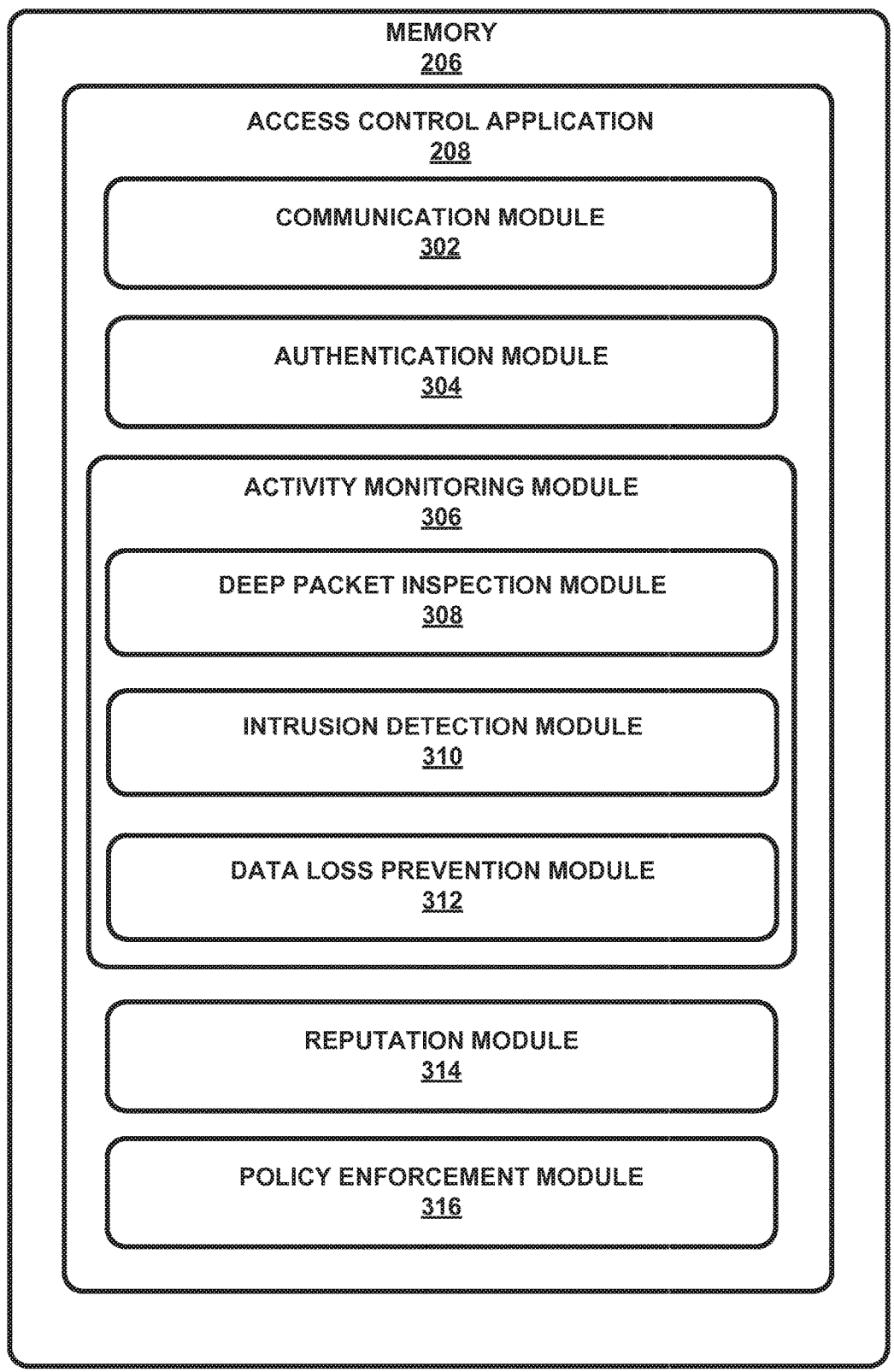
FIG. 3 is a block diagram illustrating an example access control application according to some embodiments of the present disclosure. The application is stored on a memory of the example network device or system.

FIG. 3 illustrates an example access control application 208 stored on a memory 206 according to embodiments of the present disclosure. In some embodiments, the access control application 208 includes a communication module 302, an authentication module 304, an activity monitoring module 306, a reputation module 314, and a policy enforcement module 316.

The access control application 208 can be software including routines for dynamically modifying access privileges of a client 170 based on a reputation of the client 170. In some embodiments, the access control application 208 can be a set of instructions executable by the processor 204 to provide the functionality described herein. In some other embodiments, the access control application 208 can be stored in the memory 206 and can be accessible and executable by the processor 204.

The communication module 302 can be software including routines for handling communications between the access control application 208 and other components in the digital network environment 199 (FIG. 1). In some embodiments, the communication module 302 can be a set of instructions executable by the processor 204 to provide the functionality described herein. In some other embodiments, the communication module 302 can be stored in the memory 206 of the network device 200 and can be accessible and executable by the processor 204. The communication module 302 may be adapted for cooperation and communication with the processor 204 and other components of the network device 200 such as the network interface 202, the storage 210, etc.

In some embodiments, the communication module 302 sends and receives data to and from one or more of a client 170 (FIG. 1), an access point 160 (FIG. 1) and other network devices via the network interface 202 (FIG. 2), in the event of distributed functionalities. In some embodiments, the communication module 302 handles communications between components of the access control application 208. In some embodiments, the communication module 302 receives data from other components of the access control application 208 and stores the data in the storage device 210.

The authentication module 304 can be software including routines for authenticating one or more clients 170 for accessing network resources. In some embodiments, the authentication module 304 can be a set of instructions executable by the processor 204 to provide the functionality described herein. In some other embodiments, the authentication module 304 can be stored in the memory 206 of the network device 200 and can be accessible and executable by the processor 204. The authentication module 304 may be adapted for cooperation and communication with the processor 204 and other components of the network device 200 such as the network interface 202, the storage 210, etc.

In some embodiments, the authentication module 304 performs authentication for the one or more clients 170 associated with an access point 160 and assigns access privileges for the one or more clients 170 as configured by an administrator and/or according to their specific roles in an enterprise. For example, the authentication module 304 performs a layer 2 (L2) authentication, a layer 3 (L3) authentication, or a combination of both, etc. for a client 170 and assigns access privileges corresponding to an assigned specific role for the client 170 in an office. In some embodiments, the authentication module 304 assigns a base reputation score to the client 170 when the client 170 has not been authenticated any time before to access the network resources in the network. For example, a base reputation score of "100" can be assigned to the client 170 when it is authenticated for the first time. The network resources could include a database, web content, computer programs, a printer, email, storage devices, virtual private network, etc. In some other embodiments, when the client 170 has been authenticated before, the authentication module 304 puts the client 170 in an initial role and sends instruction to the policy enforcement module 316 to modify the access privileges according to a current reputation score of the client 170.

The activity monitoring module 306 can be software including routines for monitoring activity of the one or more clients 170 in the network. In some embodiments, the activity monitoring module 306 can be a set of instructions executable by the processor 204 to provide the functionality described herein. In some other embodiments, the activity monitoring module 306 can be stored in the memory 206 of the network device 200 and can be accessible and executable by the processor 204. The activity monitoring module 306 may be adapted for cooperation and communication with the processor 204 and other components of the network device 200 such as the network interface 202, the storage 210, etc.

In some embodiments, the activity monitoring module 306 includes a deep packet inspection module 308, an intrusion detection module 310, and a data loss prevention module 312.

The deep packet inspection module 308 can be software including routines for monitoring data packets of the one or more clients 170 in the network. In some embodiments, the deep packet inspection module 308 receives one or more data packets during a session when the client 170 is accessing an application. The deep packet inspection module 308 analyzes the one or more data packets to determine, for example, what category of application is being accessed by the client 170, how long the application is being accessed by the client 170, and how many bytes of information is being exchanged by the client 170, etc. For example, the application can belong to one or more of the following categories, such as, an enterprise application, a peer-to-peer file sharing, instant messaging, social networking, video-chatting, photo-sharing, microblogging, video-sharing, and video-streaming, etc. Certain categories of application may not be permitted for use under administrative policies.

In some embodiments, the deep packet inspection module 308 uses the session of the application to look-up an application based access control list in the storage 210. For example, the application based access control list in the storage 210 can be a data structure specifying the list of applications including permissions for the applications. The permissions determine specific access rights, such as whether the client's 170 access of the application is permitted. In another example, the application based access control list in the storage 210 can be a data structure where application categories may be entries in the access control list. The deep packet inspection module 308 determines if the application accessed by the client 170 is permitted in the application based access control list in the storage 210. If the application is marked unpermitted, untrustworthy or malicious, the deep packet inspection module 308 denies the session of the client 170 accessing the application and may also drop subsequent data packets associated with the session of the application. For example, when the client 170 opens an enterprise search application to search internal database, the deep packet inspection module 308 determines that the enterprise search application is permitted for use by the client 170. In another example, when the client 170 opens a peer-to-peer file sharing application for use, the deep packet inspection module 308 determines that the peer-to-peer file sharing application is not permitted for use by the client 170 and denies the session of the peer-to-peer file sharing application. In some embodiments, the deep packet inspection module 308 sends information including the activity of the client 170 accessing the application that is unpermitted and/or malicious to the reputation module 314.

In some embodiments, the deep packet inspection module 308 does not deny the session of the application (opened on the client 170) which is unpermitted under the application based access control list when there is no exchange of data packets occurring during the session. For example, the client 170 may have an instant messaging application that is not permitted, open on the client 170 but inactive (i.e., no exchange of data packets associated with the instant messaging application), the deep packet inspection module 308 does not deny the session of the instant messaging application. In some embodiments, the deep packet inspection module 308 does not deny the session of the application which is unpermitted under the application based access control list when the application is accessed by the client 170 during a particular period of time. For example, the client 170 can access the application freely during a lunch break, after office hours, or on weekends.

In some embodiments, the deep packet inspection module 308 receives one or more data packets during a session when the client 170 is browsing the internet 140. The deep packet inspection module 308 analyzes the one or more data packets to retrieve Uniform Resource Locators (URLs) from the one or more data packets. In some embodiments, the deep packet inspection module 308 uses the retrieved URL to look up a local URL cache on the memory 206 to determine, for example, whether the URL is trusted and/or permitted. The local URL cache includes URLs on the internet 140, each assigned to a web category and a reputation score by a third-party web content classification and security services provider. For example, the content in the URLs belonging to the categories, such as, social networks, news media, sports media, blogs, microblogs, video-streaming, etc. may be updated by a third-party and not permitted for access in an office environment for productivity purposes. In another example, the reputation score assigned to each of the URLs in the local URL cache can be dynamic based on real-time content being served at the URL address. An URL which had a previously trustworthy reputation score may become infected later on with malware, spyware, etc. and the dynamically assigned reputation score for the URL will reflect the current malicious state of the URL if any.

If the URL retrieved from the one or more data packets during the session of the client 170 is matched with an unpermitted and/or malicious content in the local URL cache, the deep packet inspection module 308 drops the Hypertext Transfer Protocol (HTTP) GET request for the content associated with the URL. For example, the client 170 may be trying to access a social networking website in an office enterprise setting. In another example, the client 170 may be trying to stream a live soccer match from an untrustworthy URL infected with malicious Hypertext Markup Language (HTML) script injection. In both the examples, the deep packet inspection module 308 denies the request to download/access content from the URL. In some embodiments, the deep packet inspection module 308 sends the information including the activity of the client 170 accessing a malicious URL to the reputation module 314.

In some embodiments, the deep packet inspection module 308 receives the one or more data packets during a session when the client 170 is accessing a web-based email application accessed via a web browser or a locally installed email application. The deep packet inspection module 308 analyzes the one or more data packets to retrieve metadata information associated with the session. For example, the metadata information could include sender, receiver, attachment file name, attachment file type, attachment file size, etc. In another example, the metadata information could include Multipurpose Internet Mail Extensions (MIME) type. In some embodiments, the deep packet inspection module 308 uses the retrieved metadata information to check against file block policies configured by an administrator for exchanging emails by the one or more clients 170. For example, the administrator may have configured in the file block policies to block a certain file type, MIME type, or file size limit from being sent and/or received. The file type or MIME type may match known virus signatures (i.e., a unique string of bits that serves as a fingerprint of a virus) and the administrator institutes such a block to protect against viruses entering the network 110 maintained by the administrator.

If the retrieved metadata information from the one or more data packets during the session of the client 170 is matched against an attachment type or MIME type that is blocked by the administrator, the deep packet inspection module 308 blocks the email from being sent or received. For example, the client 170 may be trying to send an enterprise financial spreadsheet as an email attachment to a recipient who is not an authorized recipient (i.e., outside the organization). The deep packet inspection module 308 determines from the metadata that the spreadsheet file type is banned as an email attachment by checking against the file block policies and rejects the email attachment. In another example, the client 170 may be trying to forward a chain email including JavaScript in a HTML message to other clients 170. The deep packet inspection module 308 determines from the metadata that the chain email includes a MIME type ".js" indicating text/javascript which is blocked by the administrator and rejects the chain email as spam. In yet another example, the client 170 may be trying to send a file attachment that exceeds an attachment size limit. The deep packet inspection module 308 determines from the metadata that the attachment file size is too big and rejects the client 170 from sending the huge file attachment. In some embodiments, the deep packet inspection module 308 sends the information including the activity of the client 170 sending banned email attachment and/or MIME types to the reputation module 314.

The intrusion detection module 310 can be software including routines for detecting anomalies and malicious activities originated by the one or more clients 170. In some embodiments, the intrusion detection module 310 monitors the entire payload of inbound and outbound data packets being exchanged by the client 170 during a session. The intrusion detection module 310 analyzes the entire payload of data packets to identify malicious incidents associated with the client 170 in the session, to log information about the malicious incidents and to send a report including the logged information to the reputation module 314. In some embodiments, the intrusion detection module 310 may compare the inbound and outbound data packets against a database of signatures that identifies heuristics and patterns of common exploits and computer attacks. For example, the intrusion detection module 310 may detect that a client 170a is generating a Denial of Service (DoS) attack on a network resource, such as a web server, making it unavailable for another client 170b in the example digital network environment 199. The web server under the DoS attack cannot respond to a legitimate request from the client 170b because the client 170a is saturating the web server with communication requests. The intrusion detection module 310 logs the DoS attack attempted by the client 170 and sends the logged information to the reputation module 314. In another example, the intrusion detection module 310 may detect multiple clients 170 together generating a Distributed Denial of Service (DDoS) attack. The clients 170 may have become compromised by a botnet and thereby flooding the bandwidth of a targeted resource, such as a web server, with traffic. When the web server is overloaded with multiple connection requests, the web server can no longer accept new connections leading to unavailability of the web server. The intrusion detection module 310 logs the DDoS attack attempted by the multiple clients 170 and sends the logged information to the reputation module 314.

In one example, the intrusion detection module 310 may detect the client 170 performing a port scan by sending client requests to a range of server port addresses in the network 110 in order to find an open port. A port scan to find the open port can be viewed as a first step for an attack on the network resources by potentially exploiting a known vulnerability. The intrusion detection module 310 logs the port scan attack by the client 170 and sends the information to the reputation module 314. In another example, the intrusion detection module 310 may detect a client 170 using fragmentation protocol within the internet protocol as an exploit to generate DoS attacks. Fragmentation can be described as the process of breaking down an internet protocol (IP) datagram into smaller packets to be transmitted over different types of network media and protocols that have rules including a maximum size allowed for datagram on its network link (i.e. maximum transmission unit). This fragmentation process can be exploited to infiltrate and cause a Denial of Service to network resources. The intrusion detection module 310 logs the IP fragmentation attempt by the client 170 and sends the information about the client 170 acting maliciously to the reputation module 314.

The data loss prevention module 312 can be software including routines for detecting confidential and/or sensitive data breached by the one or more clients 170. In some embodiments, the data loss prevention module 312 searches the payload of data packets exchanged by the client 170 during a session and blocks the data in-motion that may be characterized as confidential and/or sensitive information. The data loss prevention module 312 analyzes the payload of data packets to detect sensitive data in the content that is being transmitted in violation of the data loss prevention policies configured by the administrator. The data loss prevention policies may classify content information, for example, in text documents as sensitive by using keywords, lexicons, regular expressions, statistical analysis, metadata tags, etc. For example, the data loss prevention module 312 may detect the client 170 is trying to copy sensitive data, such as, company intellectual property documents that is highly confidential. The data loss prevention module 312 may identify sensitive information in the intellectual property documents in-motion using exact data matching, regular expression matching, lexicons, keywords, etc. and blocks the copying process. In another example, the client 170 may be trying to send documentation for a newly developed software suite as an email attachment to a recipient who is not an authorized recipient. The data loss prevention module 312 identifies matching sensitive data in the documentation by checking against the data loss prevention policies and rejects the email attachment. In some embodiments, the data loss prevention module 312 sends the information including the activity of the client 170 violating the data loss prevention policies to the reputation module 314.

The reputation module 314 can be software including routines for determining a reputation score for the one or more clients 170 based on the client activities. In some embodiments, the reputation module 314 can be a set of instructions executable by the processor 204 to provide the functionality described herein. In some other embodiments, the reputation module 314 can be stored in the memory 206 of the network device 200 and can be accessible and executable by the processor 204. The reputation module 314 may be adapted for cooperation and communication with the processor 204 and other components of the network device 200 such as the network interface 202, the storage 210, etc.

In some embodiments, the reputation module 314 receives the information including the activities of the client 170 from the deep packet inspection module 308, the intrusion detection module 310, and the data loss prevention module 312. In some embodiments, the reputation module 314 determines a reputation score for the client 170 based on the activities of the client 170. In some other embodiments, the reputation module 314 determines the reputation score for the client 170 collectively based on a configurable weight assigned to each one of the activities of the client 170. The configurable weight for each one of the activities of the client 170 may differ in value. For example, the weight for the client 170 accessing a malicious URL can be assigned a weight of "10". In another example, the weight for the client 170 using an unpermitted instant messaging application can be assigned a weight of "1".

In some embodiments, there exists a base reputation score assigned to the client 170 when the client 170 is authenticated for the first time. In some embodiments, the different weights assigned to one or more activities of the client 170 may affect how the base reputation score is modified for the client 170 to determine a current reputation score. The reputation module 314 modifies an existing reputation score proportionally to the weight associated with the one or more activities of the client 170. For example, the equation for modifying a reputation score dynamically for the client 170 can be stated as:

$$R_{cur} = R_{base} - (a*w_{app} + m*w_{url} + f*w_{file} + i*w_{ids} + d*w_{dlp})$$

where $R_{cur}$ denotes a current reputation score, $R_{base}$ denotes the base reputation score assigned to the client 170 when successfully authenticated for the first time, "a" denotes a total number of unpermitted applications accessed by the client 170, "m" denotes a total number of malware URL requests issued by the client 170, "f" denotes a total number of banned file attachments and/or MIME types used in emails by the client 170, "i" denotes a total number of anomalous intrusions detected for the client 170, "d" denotes a total number of sensitive data breaches detected for the client 170, $w_{app}$ denotes a weight assigned for unpermitted application access, $w_{url}$ denotes a weight assigned for detected malicious URL access, $w_{file}$ denotes a weight assigned for blocked file attachments and/or MIME type in email, $w_{ids}$ denotes a weight assigned for anomalies and/or intrusions detected, and $w_{dlp}$ denotes a weight assigned for detected data breaches.

For example, the client 170 accesses six malicious URLs ($w_{url}$=10), attaches two blocked file types and/or MIME type in emails ($w_{file}$=5), and breaches sensitive and/or confidential data two times ($w_{dlp}$=5) after the client 170 is authenticated successfully. If the base reputation score assigned for the client 170 is "100", then the reputation module 314 calculates the current reputation score for the client 170 based on the above activities of the client 170 to be "20". In another example, the client 170 accesses 5 unpermitted applications ($w_{app}$=1) and accesses 2 malicious URLs ($w_{url}$=10) after the client 170 is authenticated successfully. Assuming the same base reputation score of "100", the reputation module 314 calculates the current reputation score for the client 170 based on the activities of the client 170 to be "75".

In some embodiments, the reputation module 314 maintains the reputation scores for each of the one or more clients 170 as a persistent entry in a client reputation table in the storage 210. For example, the client reputation table can be maintained as a structured query language (SQL) table and the entry in the client reputation table may include a client's 170 media access control (MAC) address, a reputation score, activity history, a last time the reputation for the client 170 was updated, etc. The reputation module 314 updates each entry in the client reputation table during the lifetime of each of the one or more clients 170 by replacing the previously cached reputation score with the current reputation score that is determined dynamically. In some embodiments, the reputation module 314 does not update the reputation score in the client reputation table for the client 170 that is inactive. For example, the authentication module 304 authenticates the client 170 but the reputation module 314 receives no information including the activity on the client 170. The reputation score previously assigned to the client 170 remains unchanged in the client reputation table. In some other embodiments, the reputation module 314 purges the entry in the client reputation table for the client 170 when the reputation module 314 receives no information including the activity on the client 170 for a period of time. For example, the period of time can vary from a couple of weeks to months. In some embodiments, the reputation module 314 synchronizes the client reputation table to one or more controllers 100 (or other network devices 200) in the embodiments where the access control application 208 is part of the one or more controllers 100.

In some embodiments, the reputation module 314 compares the current reputation score of the client 170 against one or more reputation threshold limits to determine access rights for the client 170. For example, the one or more reputation threshold limits may include a maximum threshold, an upgrade threshold, a downgrade threshold and a blacklist threshold. In some embodiments, the maximum threshold may be the base reputation score. In some embodiments, the maximum threshold can be greater than the upgrade threshold, the upgrade threshold can be greater than the downgrade threshold and the down grade threshold can be greater than the blacklist threshold. For example, the maximum threshold can be 100, the upgrade threshold can be 40, the downgrade threshold can be 20 and the blacklist threshold can be 5.

In some embodiments, the reputation module 314 determines whether the current reputation score of the client 170 is below or equal to a downgrade threshold. If the current reputation score is below or equal to the downgrade threshold, the reputation module 314 sends instructions to the policy enforcement module 316 to downgrade the access privileges for the client 170 to that of a less privileged role. This way, for example, the client 170 is prevented from spreading spyware or malware to other clients 170, generating a denial of service attack, consuming network resources for unproductive purposes, etc. In some other embodiments, the reputation module 314 determines whether the current reputation score of the client 170 is below or equal to a blacklist threshold. If the current reputation score is below or equal to the blacklist threshold, the reputation module 314 sends instructions to the policy enforcement module 316 to blacklist the client 170. For example, the client 170 is denied access by not letting the client 170 be associated with any access point 160 in the network 110.

In some embodiments, the reputation module 314 detects that the activity of the client 170 is conforming to the administrative policies configured by the administrator and gradually builds the reputation score of the client 170 that has fallen below the downgrade threshold. In some embodiments, the rate of decrease of the reputation score of the client 170 may be governed by the equation as explained above for calculating the current reputation score. In some embodiments, the reputation module 314 builds the reputation score linearly after the client 170 begins to conform to the administrative policies. For example, the reputation score is increased by one for every session of the client 170 that does not violate the administrative policies. The rate at which the reputation score increases is smaller than as compared to the rate at which the reputation score decreases. In some other embodiments, the reputation module 314 determines whether the current reputation score being built up by the client 170 is above or equal to an upgrade threshold yet. If the current reputation score is above or equal to the upgrade threshold, the reputation module 314 sends instructions to the policy enforcement module 316 to upgrade the client's 170 role to that of a more privileged role (i.e., normal role specific to the client 170).

The policy enforcement module 316 can be software including routines for enforcing the access rights for the one or more clients 170 based on the reputation score. In some embodiments, the policy enforcement module 316 can be a set of instructions executable by the processor 204 to provide the functionality described herein. In some other embodiments, the policy enforcement module 316 can be stored in the memory 206 of the network device 200 and can be accessible and executable by the processor 204. The policy enforcement module 316 may be adapted for cooperation and communication with the processor 204 and other components of the network device 200 such as the network interface 202, the storage 210, etc.

In some embodiments, the policy enforcement module 316 receives instructions from the authentication module 304 to grant access rights for the client 170 that is authenticated successfully. The policy enforcement module 316 retrieves a current reputation score for the client 170 from the client reputation table in the storage 210. The policy enforcement module 316 assigns access privileges to the client 170 corresponding to the current reputation score. For example, the policy enforcement module 316 determines that the current reputation score of the client 170 is 75, above the downgrade threshold of 20. The policy enforcement module 316 grants the client 170 access to network resources, such as database, storage devices, printer, internet, computer applications, etc. without restrictions. In another example, the policy enforcement module 316 determines that the current reputation score of the client 170 is 15, below the downgrade threshold of 20. The policy enforcement module 316 grants the client 170 access only to certain network resources, such as printer, email, enterprise application, etc. that are essential for the client 170 to function in the office. The policy enforcement module 316 restricts the access by the client 170 to the rest of the network resources. In yet another example, the client 170 may log out of the network through a first access point 160a and log back into the network at a later time through a second access point 160b. In some embodiments, the client reputation table can be distributed and maintained in all network devices 200. The policy enforcement module 316 determines that the current reputation score of the client 170 is 4 in the client reputation table which is below the blacklist threshold of 5. The policy enforcement module 316 denies all access privileges to the client 170 because of an existing blacklist associated with that reputation score.

In some embodiments, the policy enforcement module 316 receives instructions from the reputation module 314 to modify the access privileges for the one or more clients 170. In some embodiments, the policy enforcement module 316 modifies the access rights dynamically for the client 170 by downgrading the client 170 to a new role with fewer privileges than before based on the changing reputation score of the client 170. For example, the policy enforcement module 316 determines that the current reputation score of the client 170 is equal to or below the downgrade threshold. If so, the policy enforcement module 316 may restrict installation of new software applications, such as instant messaging, music streaming, media player, etc. on the client 170. In another example, the policy enforcement module 316 may restrict the internal database access, internet access, etc. for the client 170 when the current reputation score of the client 170.

In some embodiments, the policy enforcement module 316 upgrades the access rights for the client 170 previously put in a restricted role by reinstating the privileges when the reputation score of the client 170 exceeds an upgrade threshold. For example, the policy enforcement module 316 determines that the current reputation score of the client 170 has gradually built up to or above the upgrade threshold of 40 and grants revoked privileges, such as, internet access, internal database access, computer applications, etc. back to the client 170. In some embodiments, the upgrade threshold may or may not be the same as the downgrade threshold. In some other embodiments, the upgrade threshold is higher than the downgrade threshold.

In some embodiments, the policy enforcement module 316 times out the session of the client 170 corresponding to the old role once the client 170 is moved to a new role.

In some embodiments, the policy enforcement module 316 determines whether the client 170 can be steered to from one radio frequency band to another radio frequency band based on the reputation score of the client 170. For example, the policy enforcement module 316 determines the reputation score of the client 170 is below the downgrade threshold and throttles bandwidth of the client 170. The policy enforcement module 316 moves the client 170 from the IEEE 802.11a using the 5 GHz band to the IEEE 802.11g using the 2.4 GHz band. This band steering reduces interference on the IEEE 802.11a using the 5 GHz band for the other clients 170 with the reputation score greater than the downgrade threshold. When the client starts to conform to the administrative policies and the reputation score increases to exceed to the upgrade threshold, the policy enforcement module 316 moves the client 170 from the IEEE 802.11g using the 2.4 GHz band to the IEEE 802.11a using the 5 GHz band.

In some embodiments, the policy enforcement module 316 sends a warning notification to the client 170 when the reputation score of the client 170 is dropping because of inappropriate client activity. In some embodiments, the policy enforcement module 316 determines whether the reputation score of the client 170 is below an upgrade threshold and above a downgrade threshold. If so, the policy enforcement module 316 sends a warning notification to the client 170 indicating that the client 170 is at risk of a downgrade if the client's 170 activities continue to violate the administrative policies. In some other embodiments, the policy enforcement module 316 determines whether the reputation score of the client 170 is below a downgrade threshold and above a blacklist threshold. If so, the policy enforcement module 316 sends a warning notification to the client 170 indicating that the client 170 is at risk of being blacklisted if the client's 170 activities continue to violate the administrative policies. For example, the warning notification can be a simple pop-up notification on a display of the client 170 when the client 170 is active. The warning notification is displayed so that the client 170 is not caught by surprise when the access privileges for the client device get downgraded because of continued administrative policy violations.

Example Processes

Figure 4:
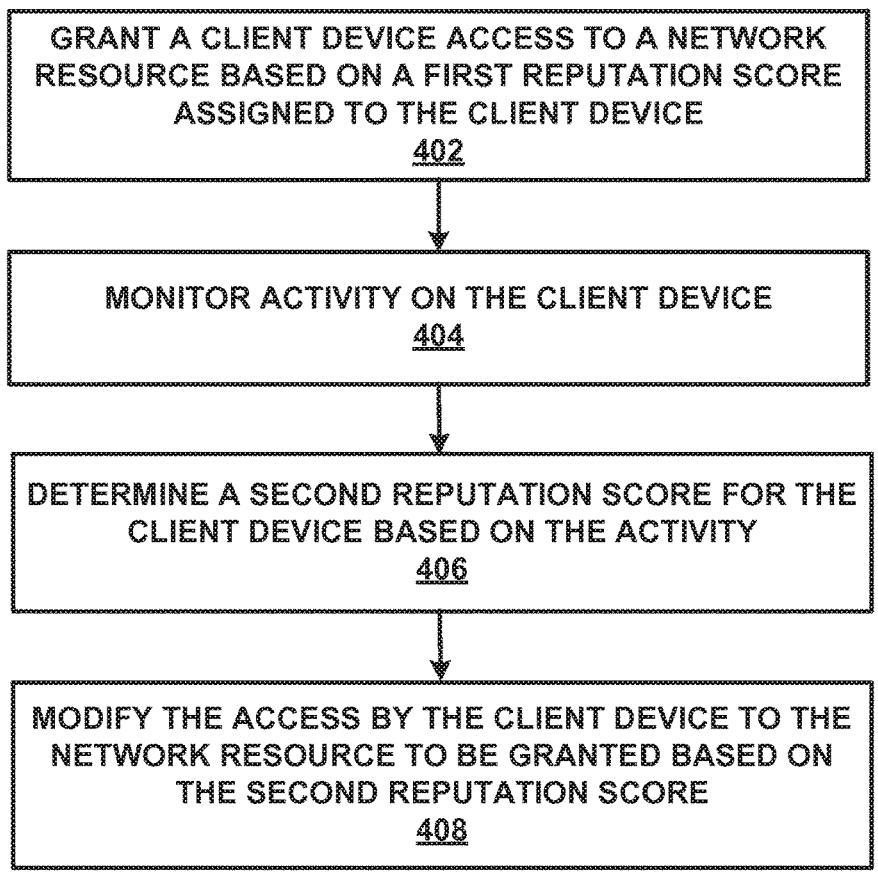
FIG. 4 illustrates an example process for modifying access of a network resource by a client device according to embodiments of the present disclosure.

FIG. 4 illustrates an example process 400 for modifying access of a network resource by a client device according to embodiments of the present disclosure. The process 400 begins when the policy enforcement module 316 grants 402 a client device access to a network resource based on a first reputation score assigned to the client device. In some embodiments, the network resources may include, but are not limited to the following examples: printer, internet, database, storage devices, computer programs, applications, etc. The activity monitoring module 306 monitors 404 activity on the client device. For example, in some embodiments, the activity monitored on the client device can be what category of applications is being accessed by the client device. As another example, in other embodiments, the activity monitored on the client device can be whether any malicious URLs are being requested by the client device. The reputation module 314 determines 406 a second reputation score for the client device based on the activity. In some embodiments, how the second reputation score is determined is directly proportional to a weight associated with each of one or more activities of the client device. For example, the weight for accessing a malicious URL can be 10, the weight for blocked file type/MIME types in email attachments can be 5, and the weight for breaching sensitive data can be 5. The policy enforcement module 316 modifies 408 the access by the client device to the network resource to be granted based on the second reputation score. For example, in some embodiments, when the second reputation score is less than the downgrade threshold, the policy enforcement module 316 downgrades the access by the client device to certain network resources, such as printer, email, etc. that are essential for the client 170 to function and restricts the access by the client 170 to the rest of the network resources.

Figure 5:
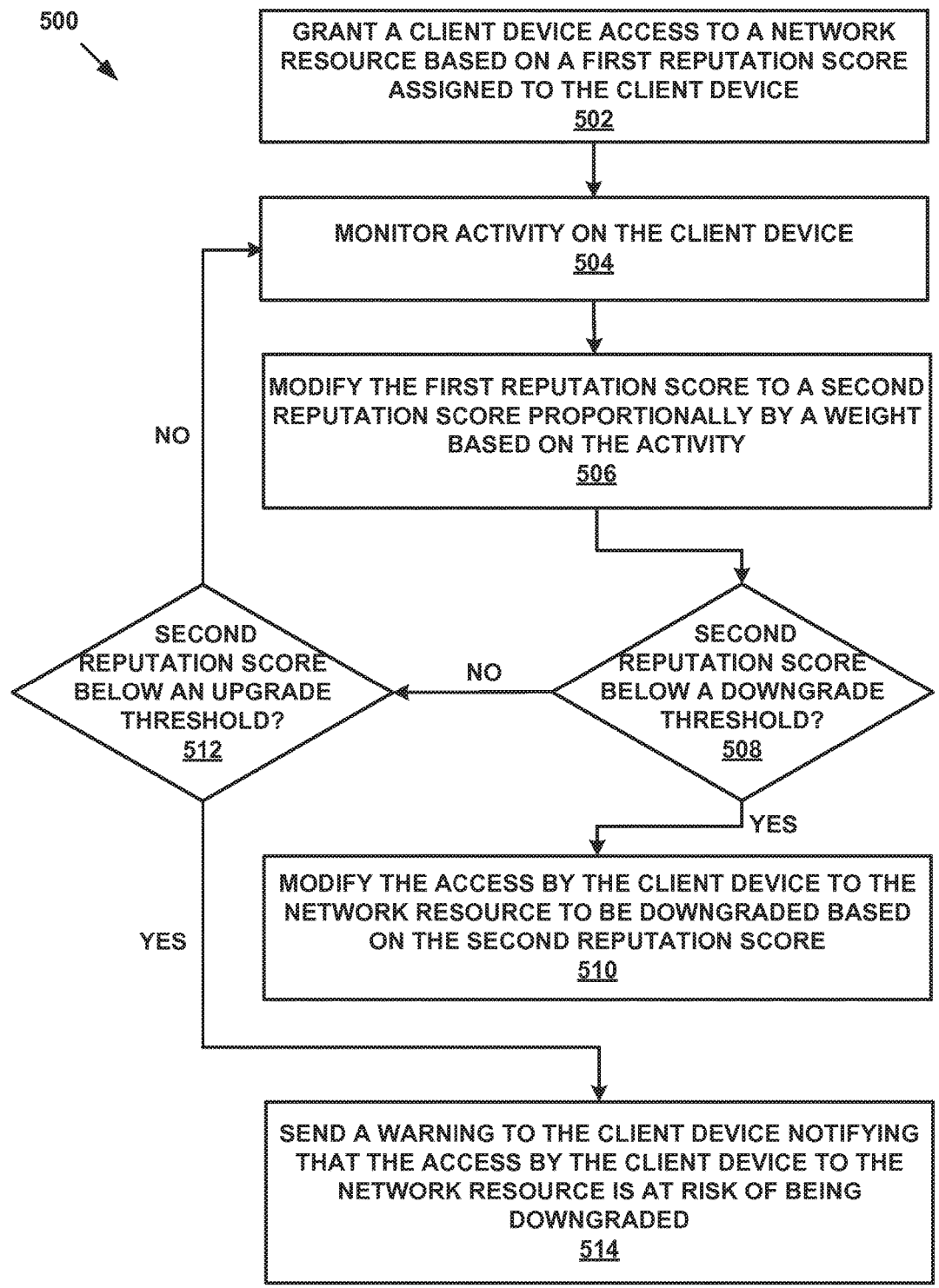
FIG. 5 illustrates an example process for downgrading access of a network resource by a client device according to embodiments of the present disclosure.

FIG. 5 illustrates an example process 500 for downgrading access of a network resource by a client device according to embodiments of the present disclosure. The process 500 begins when the policy enforcement module 316 grants 502 a client device access to a network resource based on a first reputation score assigned to the client device. For example, in some embodiments, the policy enforcement module 316 determines that the first reputation score of the client device is above the downgrade threshold. The policy enforcement module 316 grants the client device access to network resources, such as database, storage devices, printer, internet, computer applications, etc. without restrictions. The activity monitoring module 306 monitors 504 activity on the client device. For example, in some embodiments, the activity monitored on the client device can be whether the client device has breached sensitive data. As another example, in other embodiments, the activity monitored on the client device can be whether the client device is originating denial of service attacks. The reputation module 314 modifies 506 the first reputation score to a second reputation score proportionally by a weight based on the activity. For example, in some embodiments, the client device may access four malicious URLs ($w_{url}$=10), attache five blocked file types and/or MIME type in emails ($w_{file}$=5), and breach sensitive and/or confidential data four times ($w_{dlp}$=5) after the client device is authenticated successfully. If the base reputation score assigned for the client device is "100", then the reputation module 314 calculates the second reputation score for the client device based on the above activities of the client device to be "15".

Next, the reputation module 314 determines 508 whether the second reputation score is below a downgrade threshold. For example, in some embodiments, the downgrade threshold can be 20. If the second reputation score is below the downgrade threshold, the policy enforcement module 316 modifies 510 the access by the client device to the network resource to be downgraded based on the second reputation score. For example, in some embodiments, the policy enforcement module 316 revokes internet access, internal database access, client administrator rights to install new computer applications, etc. on the client device. If the second reputation score is not below the downgrade threshold, the policy enforcement module 316 determines 512 whether the second reputation score is below an upgrade threshold. For example, in some embodiments, the upgrade threshold can be 40. If the second reputation score is below the upgrade threshold, the policy enforcement module 316 sends 514 a warning to the client device notifying that the access by the client device to the network resource is at risk of being downgraded. For example, in some embodiments, when the client device continues to violate the administrative policies, the client device's reputation score may decrease drastically. The warning notification is displayed as a pop-up on the display of the client device such that the client device is not caught by surprise when the access privileges for the client device get downgraded because of continued policy violations. If the second reputation score is not below the upgrade threshold, the process 500 repeats from block 504.

Figure 6:
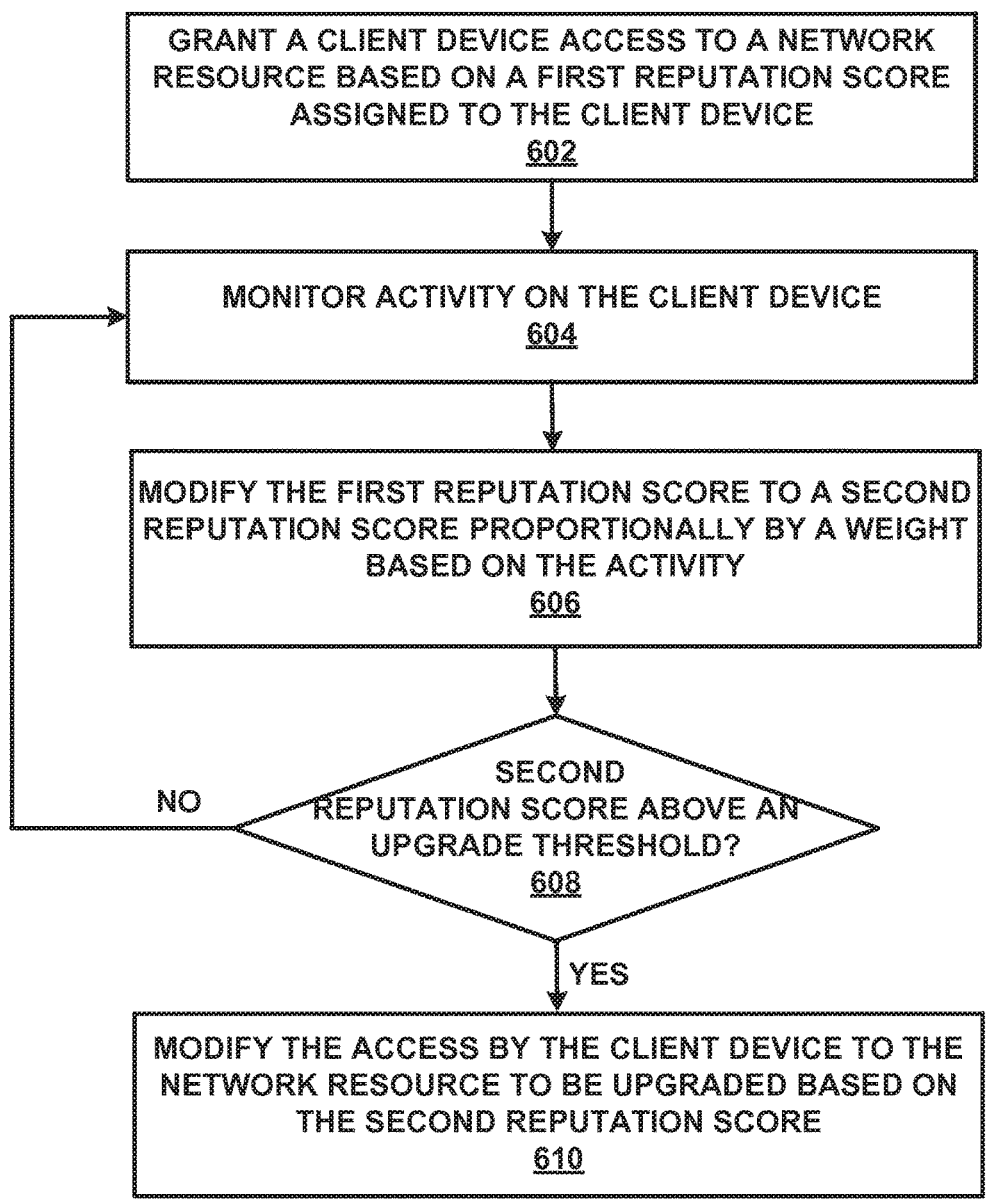
FIG. 6 illustrates an example process for upgrading access of a network resource by a client device according to embodiments of the present disclosure.

FIG. 6 illustrates an example process 600 for upgrading access of a network resource by a client device according to embodiments of the present disclosure. The process 600 begins when the policy enforcement module 316 grants 602 a client device access to a network resource based on a first reputation score assigned to the client device. For example, in some embodiments, the client device may previously be put in a restricted role. The policy enforcement module 316 grants the client device access only to certain network resources, such as printer, email, enterprise application, etc. that are essential for the client device to function in the organization. The policy enforcement module 316 restricts the access by the client device to the rest of the network resources. The activity monitoring module 306 monitors 604 activity on the client device. For example, in some embodiments, the activity monitored on the client device can be whether enterprise applications, licensed software programs, permitted web URLs, etc. related to a specific role are being accessed on the client device. The reputation module 314 modifies 606 the first reputation score to a second reputation score proportionally by a weight based on the activity. For example, in some embodiments, the rate of increase of the reputation score for the client device may be smaller than as compared to the rate of decrease of the reputation score. As another example, in other embodiments, the reputation module 314 increases the reputation score by one (i.e. linearly) for every session of the client device that does not violate the administrative policies.

Next, the reputation module 314 determines 608 whether the second reputation score is above an upgrade threshold. For example, in some embodiments, the upgrade threshold is greater than the downgrade threshold. If the second reputation score is above the upgrade threshold, the policy enforcement module 316 modifies 610 the access by the client device to the network resource to be upgraded based on the second reputation score. For example, in some embodiments, the policy enforcement module 316 determines that the second reputation score of the client device is above the upgrade threshold and grants revoked privileges, such as, internet access, internal database access, computer applications, etc. back to the client device. If the second reputation score is not above the upgrade threshold, the process 600 repeats from block 604.

Figure 7:
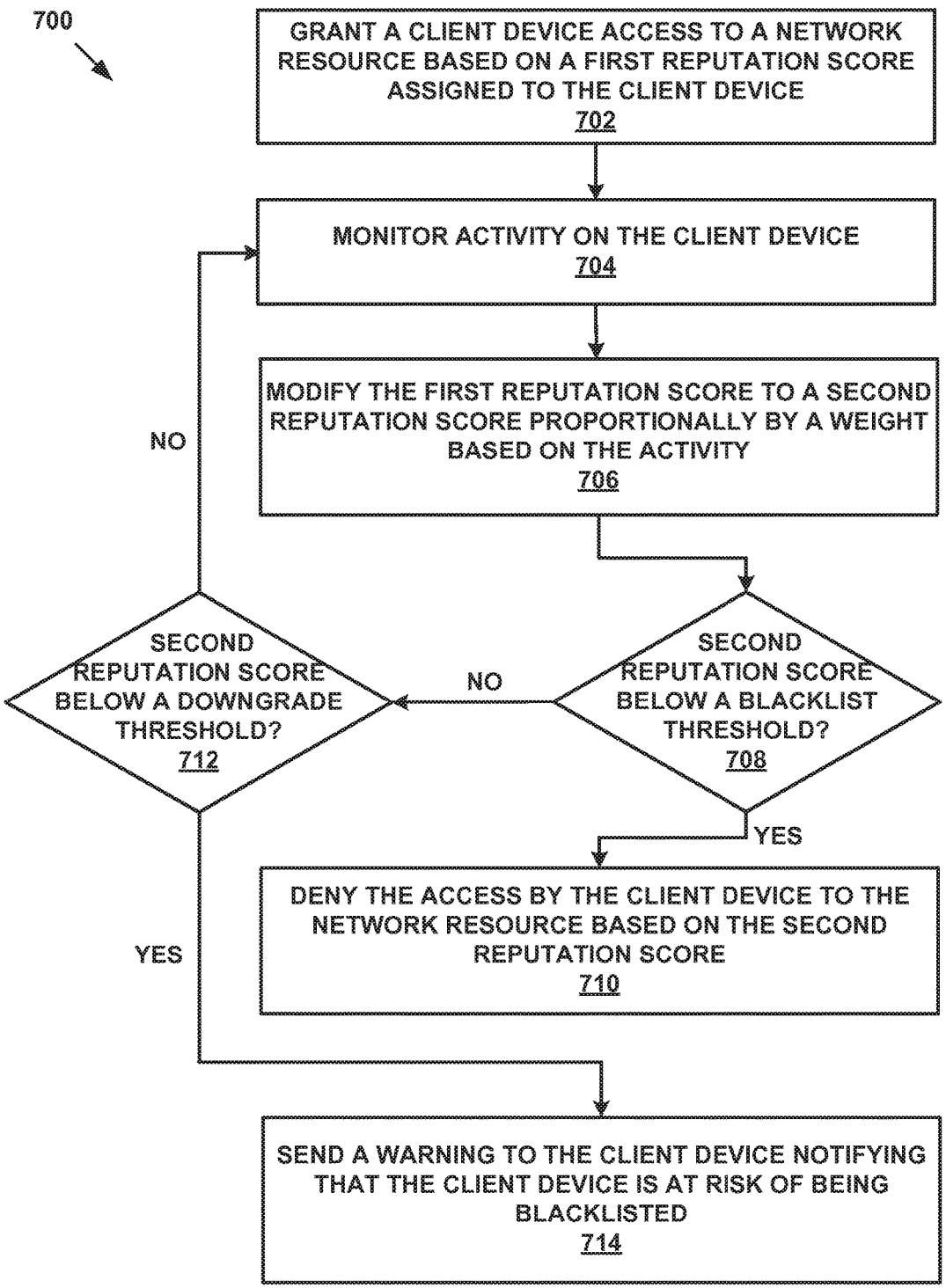
FIG. 7 illustrates an example process for blacklisting a client device according to embodiments of the present disclosure.

FIG. 7 illustrates an example process 700 for blacklisting a client device according to embodiments of the present disclosure. The process 700 begins when the policy enforcement module 316 grants 702 a client device access to a network resource based on a first reputation score assigned to the client device. For example, in some embodiments, the policy enforcement module 316 determines that the first reputation score of the client 170 is 15, below the downgrade threshold of 20. The policy enforcement module 316 grants the client 170 access only to certain network resources, such as printer, email, enterprise application, etc. that are essential for the client 170 to function in the office. The activity monitoring module 306 monitors 704 activity on the client device. For example, in some embodiments, the activity monitored on the client device can be whether the client device has breached sensitive data. As another example, in other embodiments, the activity monitored on the client device can be whether any malicious URLs are being requested by the client device. The reputation module 314 modifies 706 the first reputation score to a second reputation score proportionally by a weight based on the activity. For example, in some embodiments, the client device may access two unpermitted applications, ($w_{app}=1$) five malicious URLs ($w_{url}=10$), attach five blocked file types and/or MIME type in emails ($w_{file}=5$), and breach sensitive and/or confidential data four times ($w_{dlp}=5$). If the base reputation score assigned for the client device is "100", then the reputation module 314 calculates the second reputation score for the client 170 based on the above activities of the client 170 to be "3".

Next, the reputation module 314 determines 708 whether the second reputation score is below a blacklist threshold. For example, in some embodiments, the blacklist threshold can be 5. If the second reputation score is below the blacklist threshold, the policy enforcement module 316 denies 710 the access by the client device to the network resource based on the second reputation score. For example, the policy enforcement module 316 denies all access privileges to the client device because of an existing blacklist associated with that reputation score. As another example, in some embodiments, the client device is denied access by not letting the client device be associated with any access point 160 in the network 110. If the second reputation score is not below the blacklist threshold, the policy enforcement module 316 determines 712 whether the second reputation score is below a downgrade threshold. If the second reputation score is below the downgrade threshold, the policy enforcement module 316 sends 714 a warning to the client device notifying that the client device is at risk of being blacklisted. If the second reputation score is not below the downgrade threshold, the process 700 repeats from block 704.

FIG. 8 is an example graphic representation 800 illustrating an example process for determining a client reputation score according to embodiments of the present disclosure. Referring to FIG. 8, a table 802 including entries for a number of client devices (C1, C2, C3, C4 . . . Cn) in the example digital network environment 199 is illustrated. The table 802 includes the client device name, the number of blocked sessions associated with the client device and the client reputation score. The number of blocked sessions could include accessing unpermitted applications, accessing malicious URLs, attaching a banned file type and/or MIME type in email, generating intrusive attacks and data breach. Each blocked session has an associated weight that proportionally affects how the client reputation score is determined. In the table 802, the entry 804 for client device C2 indicates that the client device C2 includes six sessions blocked under column "Malware/Spyware URL", two sessions blocked under column "Attachment/MIME type" and two sessions blocked under column "DLP". Assuming the initial client reputation (i.e., base reputation score) is 100, the client reputation is calculated for client device C2 which is equal to the threshold reputation. The client device C2 can be subjected to a downgrade with a less privileged role.

Figure 9:
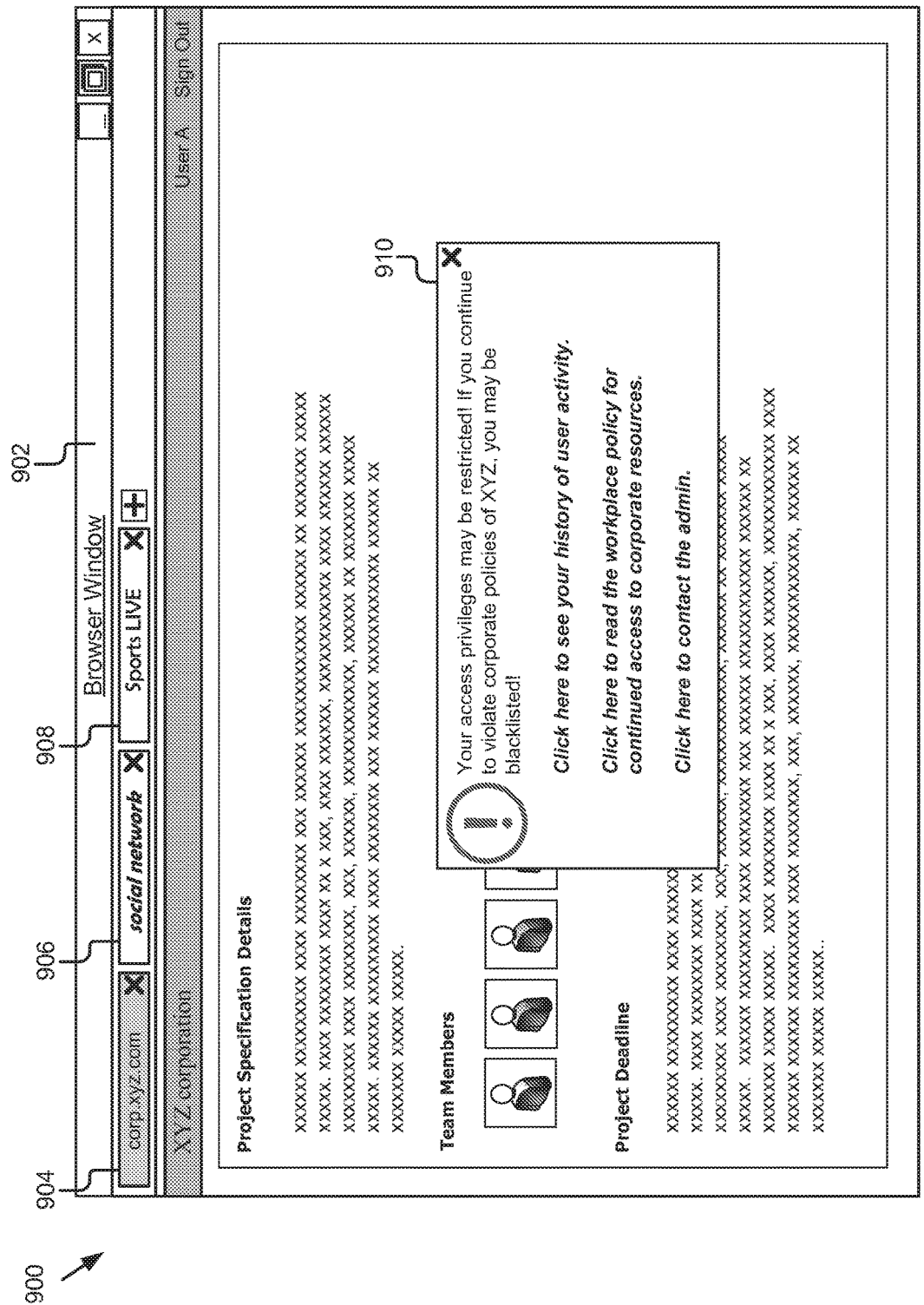
FIG. 9 illustrates an example graphical representation of a user interface for displaying a warning notification on the client device according to embodiments of the present disclosure.

FIG. 9 is an example graphical representation 900 illustrating a user interface for displaying a warning notification on the client device according to embodiments of the present disclosure. Referring to FIG. 9, the graphical representation 900 includes a browser window 902 with multiple tabs. The tabs in the browser window 902 include an employer website 904, a social network website 906, and a sports news website 908. In some embodiments, the client device accessing the social network website 906 and the sports news website 908 may not be permitted to do so under administrative policies of the employer. The graphical representation 900 includes a pop-up warning notification 910 in the browser window 902. The pop-up warning notification 910 displays a warning that the client device may be downgraded to a role with restricted privileges or even blacklisted if the client activities, such as, accessing unpermitted URLs, etc. continue.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

It will be appreciated to those skilled in the art that the preceding examples and embodiments are example and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions executable by a processing resource to:
    grant a client device access to network resources of a network in accordance with a first configuration based on a first reputation score assigned to the client device;
    identify, from metadata recovered from deep packet inspection of data packets exchanged between the client device and an application during a network session when the client device accesses the application, a characteristic of the access of the application by the client device characterizing the application and quantifying a metric of the data packet exchange;
    determine whether the access is permitted based on a comparison of the characteristic of the access of the application to a data structure specifying a plurality of application access permissions assigned to the client device for a plurality of applications;

modify, based on the determination, the first reputation score to a second reputation score; and modify the access by the client device to the network resources to be granted in accordance with a second configuration based on the second reputation score.

2. The non-transitory computer readable medium of claim 1, wherein the instructions to modify the first reputation score to the second reputation score comprise instructions to:

decrease the first reputation score to obtain a third reputation score based on a first set of actions performed by the client device during a first period of time; and increase the third reputation score to obtain the second reputation score based on a second set of actions performed by the client device during a second period of time.

3. The non-transitory computer readable medium of claim 1, wherein the instructions to modify the first reputation score to the second reputation score comprise instructions to modify the first reputation score by an amount proportional to a weighted value associated with each of the characteristic of the access.

4. The non-transitory computer readable medium of claim 1, comprising instructions executable by the processing resource to distribute the second reputation score assigned to the client device to a plurality of network devices.

5. The non-transitory computer readable medium of claim 1, comprising instructions executable by the processing resource to:

store the second reputation score in association with the client device;

assign the stored second reputation score to the client device responsive to the client devices logging into a network after a prior logout.

6. The non-transitory computer readable medium of claim 1, wherein the modified access to the network resources granted to the client device in accordance with the second configuration based on the second reputation score includes access to a second set of network resources different than the network resources the client device was granted access to in accordance with the first configuration based on the first reputation score.

7. The non-transitory computer readable medium of claim 1, wherein the access to the network resources granted to the client device in accordance with the first configuration based on the first reputation score includes access to the network resources using a first bandwidth for the client device, and wherein the access to the network resources granted to the client device in accordance with the second configuration includes access to the network resources using a second bandwidth for the client device different than the first bandwidth.

8. The non-transitory computer readable medium of claim 1, comprising instructions executable to monitor content of data packets exchanged between the client device and the plurality of applications while the client device accesses each of the plurality of applications.

9. The non-transitory computer readable medium of claim 8, wherein the instructions executable to monitor the content of the data packets exchanged by the client device between the client device and the plurality of applications includes instructions to monitor an electronic mail attachment transmitted by the client device or received by the client device to detect a virus signature contained in the electronic mail attachment.

10. The non-transitory computer readable medium of claim 1, wherein the instructions executable to identify the characteristic of the access of the application includes instructions executable to identify a type of the application accessed by the client device.

11. The non-transitory computer readable medium of claim 10, wherein the type of application comprises at least one of a social networking application, an instant messaging application, a peer-to-peer file sharing application, a video-chatting application, a photo-sharing application, a microblogging application, a video-sharing application, and a video streaming application.

12. The non-transitory computer readable medium of claim 1, wherein a rate of change for increasing the first reputation score is smaller than a rate of change for decreasing the first reputation score.

13. A method comprising:

granting a client device access to network resources of a network in accordance with a first configuration based on a first reputation score assigned to the client device;

identifying, from metadata recovered from deep packet inspection of data packets exchanged between the client device and an application during a network session, a characteristic of the access of the application by the client device characterizing the application and quantifying a metric of the data packet exchange;

determining whether the access is permitted based on the characteristic of the access of the application and a data structure specifying a plurality of application access permissions assigned to the client device for a plurality of applications;

modifying, based on the determination, the first reputation score to a second reputation score; and modifying the access by the client device to the network resources to be granted in accordance with a second configuration based on the second reputation score.

14. The method of claim 13, comprising modifying the first reputation score based on a productivity level of the client device.

15. The method of claim 13, comprising identifying, from the metadata recovered from the deep packet inspection of the data packets exchanged between the client device and the application during the network session, data breached by the client device, wherein the data is confidential and sensitive.

16. The method of claim 13, comprising identifying, from the metadata recovered from the deep packet inspection of the data packets exchanged between the client device and the application during the network session, a denial of service attack originated by the client device.

17. A system, comprising:

a processing resource; and a memory resource storing instructions executable by the processing resource to:

grant a client device access to a plurality of network resources of a network in accordance with a first configuration based on a first reputation score assigned to the client device, identify, from metadata recovered from deep packet inspection of data packets exchanged between the client device and an application during a network session when the client device accesses the application, a characteristic of the access of the application by the client device characterizing the application and quantifying a metric of the data packet exchange,
determine, based on the characteristic of the access identified from the metadata and a data structure specifying a plurality of application access permissions assigned to the client device for a plurality of applications, whether the access is permitted,
modify the first reputation score to a second reputation score based on the determination of whether the access by the client device of the application is permitted, and
modify access by the client device to the plurality of network resources to be granted in accordance with a configuration that is based on the second reputation.

18. The system of claim 17, wherein the instructions to modify the access by the client device to the plurality of network resources includes instructions to:
determine when the second reputation score is below a downgrade threshold, wherein the downgrade threshold is a lower limit reputation score associated with an amount of access by the client device to the plurality of network resources; and
restrict the amount of access by the client device to less than all of the plurality of network resources, in response to a determination that the second reputation score is below the downgrade threshold.

19. The system of claim 17, wherein the instructions to modify the first reputation score include instructions to modify the first reputation score based on a trust category associated with content at a first network resource of the plurality of network resources accessed by the client device.

20. The system of claim 17, further comprising instruction to:
modify the second reputation score to a third reputation score based on content of the data packets exchanged by the client device since the determination of the second reputation score;
determine that the third reputation score is above an upgrade threshold, wherein the upgrade threshold is an upper limit reputation score associated with an amount of access by the client device to the plurality of network resources; and
modify the amount of access by the client device to the plurality of network resources based on the third reputation score and the upgrade threshold.

* * * * *